Patented July 26, 1955

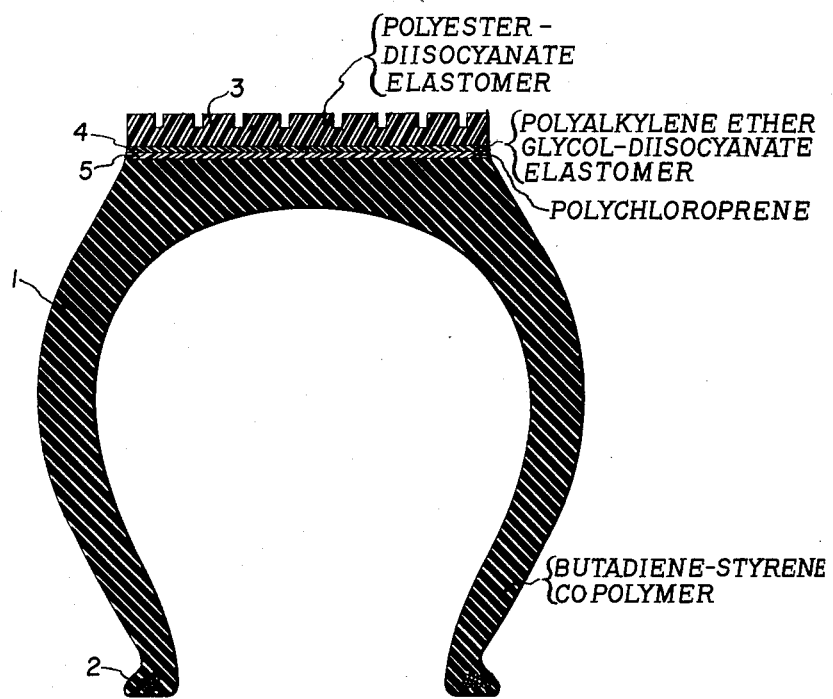
INVENTOR
HAROLD G. SCHWARTZ

2,713,884

COMPOSITE ELASTIC STRUCTURES

Harold G. Schwartz, Woodstown, N. J., assignor to E. I. du Pont de Nemours and Company, Wilmington, Del., a corporation of Delaware Application November 6, 1953, Serial No. 390,753

7 Claims. (Cl. 152—330)

This invention relates to composite elastic structures in which various types of elastomers are adherently joined together. More particularly it relates to composite structures in which polyester-diisocyanate elastomers are adherently attached to other elastomers. A particular embodiment relates to vehicle tires in which a polyester-diisocyanate elastomer comprises the outer portion of the tread and other elastomers comprise inner parts of the tire casing.

In German Patents Nos. 831,604, 831,772, and 838,826, and in U. S. Patents Nos. 2,620,516, 2,621,166, 2,625,531, 2,625,532, and 2,625,535, there are described polyester-diisocyanate elastomers prepared from organic diisocyanates and high molecular weight linear polyesters and water or other chain extending agent. Products of this type have been sold in Germany under the name "Vulcollan." These products have many useful properties including high tensile strength and abrasion resistance. They do not however, adhere well to most of the other common elastomers, and as a result composite structures or laminates with such elastomers cannot be formed directly. The polyester-diisocyanate elastomers do not form a good bond with natural rubber or with GR–S butadiene-styrene copolymers, the two elastomers from which most automobile tire carcasses are made. Although the high abrasion resistance of the polyester elastomers makes them well suited for use in tire treads, their poor adhesion to natural rubber or GR–S precludes the manufacture of tires in which such treads are directly bonded to the tire carcasses.

One known method of adhering polyester-diisocyanate elastomers to other elastomers is to prepare a graduated series of blends of the polyester type elastomer with the other elastomer and to join them in such a way that the composition of any one layer differs only slightly from that of its immediate neighbors. Thus if it is desired to bond the polyester elastomer to natural rubber, a blend containing 90% rubber and 10% polyester rubber is prepared and adhered directly to the rubber. Successive layers, each containing 10% more of the polyester rubber, are prepared and added in turn until finally a top layer of pure polyester rubber can be applied. This method gives satisfactory adhesion but is impractical.

A different method of bonding the polyester rubbers to other elastomers is described in German Patent 872,398. This method uses an intervening layer of a textile fabric as a binding material.

It is an object of this invention to provide composite structures in which polyester-diisocyanate elastomers are strongly attached to natural rubber, GR–S, polychloroprene and other types of elastomers. A further object is the provision of tire structures having polyester-diisocyanate elastomer wearing surfaces bonded to inner portions of the tire casing made from other elastomers. Further objects will appear from the description of this invention which follows.

These and other objects are accomplished by the present invention in which a polyester-diisocyanate elastomer is attached to an elastomer selected from the group consisting of natural rubber, butadiene-styrene copolymers such as GR–S, Buna S, "Chemigum" IV and "Hycar" OS, butadiene polymers such as Buna 85, Buna 115 and X–638 GR–S, butadiene-acrylonitrile copolymers such as Buna N, Perbunan, "Hycar" OR, "Chemigum" N and "Butaprene" N, and polyacrylic acid ester polymers such as "Hycar" PA, by means of intervening adherent layers of a polyalkylene ether glycol-diisocyanate elastomer and of polychloroprene, the layer of polyalkylene ether glycol-diisocyanate elastomer being interposed between the layer of polyester-diisocyanate elastomer and the layer of polychloroprene.

Such composite structures are conveniently prepared by coating the underlying layer of natural rubber, GR–S, etc. with a solution of polychloroprene, placing a thin sheet of polyalkylene ether glycol-diisocyanate elastomer against the polychloroprene surface, placing the polyester-diisocyanate elastomer layer on top and curing the composite structure with heat and pressure. A thin sheet of polychloroprene may be employed instead of or in addition to the polychloroprene solution. Similarly, a solution of the polyalkylene ether glycol-diisocyanate elastomer in tetrahydrofuran or other solvent may be used instead of or in addition to a thin sheet of this elastomer.

In a typical method of fabricating a tire from uncured stock, the tire carcass comprising natural rubber or GR–S is coated with a solution of polychloroprene and the solvent is allowed to evaporate. A pre-formed polyalkylene ether glycol-diisocyanate elastomer cushion is then applied and stitched or rolled down to make good contact with the carcass. A pre-formed polyester-diisocyanate elastomer tread slab is then applied and stitched or rolled down. The assembly is then placed in a mold and cured under suitable conditions of heat and pressure.

In a convenient method of preparing a retread from a tire composed of natural rubber or GR–S, the surface of the tire carcass or of the remaining tread surface is first roughened and then coated with a solution of neoprene. The solvent is allowed to evaporate. A thin sheet or cushion of neoprene is then applied and stitched to secure good contact. A pre-formed thin sheet or cushion of polyalkylene ether glycol-diisocyanate elastomer is applied and stitched or rolled down. Finally a pre-formed polyester-isocyanate elastomer tread slab is applied and stitched or rolled. The assembly is placed in a mold and cured with the application of heat and pressure. As in the case of tires fabricated from uncured stock, the tread in the retreaded tire is strongly bonded to the carcass.

An automobile tire embodying my invention is illustrated schematically in cross-section in the attached drawing. In the drawing, a tire carcass 1 made of a butadiene-styrene copolymer and containing reinforcing bead wires 2 is attached to the tread 3 comprising a polyester-diisocyanate elastomer by means of intervening layers 4 and 5 comprising a polyalkylene ether glycol-diisocyanate elastomer and polychloroprene, respectively.

The polyester-diisocyanate elastomers with which this application is concerned are those described in any of the patents mentioned previously. They are ordinarily prepared by reacting together a high molecular weight linear polyester, an organic diisocyanate, and a chain extending agent containing a plurality of active hydrogen atoms. Preferred products are those in which the linear polyester is made by the reaction of adipic acid with a mixture of ethylene glycol and propylene glycol. Water is the most common chain extending agent. These elastomers may be compounded with fillers, plasticizers, antioxidants, accelerators and other usual additives for elastomers. In order to cure properly, these products either must contain an adequate amount of unreacted isocyanate groups or must have a curing agent such as a di- or triisocyanate added.

The polyalkylene ether glycol-diisocyanate elastomers which serve to bond the polyester-diisocyanate elastomer to the polychloroprene layer are those disclosed and claimed in application Serial No. 365,270 of Frederick B. Hill, Jr., filed June 30, 1953. These products are ordinarily prepared by reacting together a high molecular weight polyalkylene ether glycol, an organic diisocyanate and a chain extending agent containing a plurality of active hydrogen atoms. Preferred products are those made using polytetramethylene ether glycol having a molecular weight of at least 750, an arylene diisocyanate such as 2,4-tolylene diisocyanate, and water. Instead of reacting the polyalkylene ether glycol with a diisocyanate directly, the former compound may be reacted with phosgene to form a bis-chloroformate. Reaction of this product with a diamine and phosgene yields elastomers essentially identical with those obtained by the direct reaction, as disclosed in application Serial No. 388,454 of Carter et al., filed October 26, 1953. The term "polyalkylene ether glycol-diisocyanate elastomer," as used herein, is intended to include such products. Like the polyester-diisocyanate elastomers, the polyalkylene ether glycol-diisocyanate elastomers may be compounded with fillers, plasticizers, antioxidants, accelerators and other usual additives, and must either contain unreacted isocyanate groups or have added curing agents present.

As described in my pending application Serial No. 381,143, filed September 18, 1953, polychloroprene, i. e., neoprene, a polymer of 2-chlorobutadiene-1,3, appears to be unique in its ability to cause adequate adherence of the polyalkylene ether glycol-diisocyanate elastomers to the other common elastomers. The polyalkylene ether glycol-diisocyanate elastomer will not adhere well directly to natural rubber, GR–S, butadiene-arcylonitrile copolymers, polyacrylic acid ester polymers, or butadiene polymers, but in each case a strong bond may be achieved using a polychloroprene interlayer. Polychloroprene appears to be ineffective in bonding the polyalkylene ether glycol-diisocyanate elastomers to butyl rubber or to silicone rubber.

The polyester-diisocyanate elastomers similarly will not adhere well directly to natural rubber, GR–S, butadiene-acrylonitrile copolymers, polyacrylic acid ester polymers or butadiene polymers. Unlike the polyalkylene ether glycol-diisocyanate elastomers, they adhere only moderately well directly to polychloroprene. They will, however, adhere strongly to polyalkylene ether glycol-diisocyanate elastomers and by means of an interlayer made of such material can be bonded to polychloroprene and in turn to natural rubber, GR–S and the other elastomers mentioned above.

The polychloroprene adhesive layer should be at least 1 to 2 mils thick and may be very much thicker, although there is no advantage in using a layer thicker than about 200 to 300 mils. When a polychloroprene sheet is used in the composite structure, it will ordinarily be from 20 to 80 mils thick and preferably from about 40 to 50 mils. Polychloroprene solutions may be made up by any of the conventional methods described in "The Neoprenes" by N. L. Catton, published by E. I. du Pont de Nemours and Company, Inc., Rubber Chemicals Division (1953). Suitable solvents include toluene and mixtures of hexane and methylethylketone. The polychloroprene used in solution or as a calendered interlayer sheet may contain various compounding agents such as peptizers, antioxidants, plasticizers, carbon black, etc.

The polyalkylene ether glycol-diisocyanate elastomer adhesive layer should be at least one-half mil in thickness. As in the case of the polychloroprene layer, this layer may be very much thicker, although there is ordinarily no advantage in using a layer thicker than about 200 to 300 mils. The thickness of this interlayer is ordinarily between 20 and 80 mils and preferably from about 40 to 50 mils.

The structures of this invention and the method of preparing them are illustrated by the following examples.

EXAMPLE 1

*Adhesion of various components to one another*

A. PREPARATION OF POLYESTER-DIISOCYANATE ELASTOMER

Into a vessel are placed 4375 parts of adipic acid, 2125 parts of ethylene glycol, 825 parts of propylene glycol, and 0.5 part of p-toluene sulfonic acid. The mass is heated gradually from 150° to 225° C. over a period of ten hours while a stream of nitrogen is passed slowly through the vessel. The mass is then put under a vacuum at a pressure of 1 mm. and heated with a pot temperature of 210–220° C. for twenty hours. The resulting polyester glycol has a hydroxyl number of 38.5, an acid number of 1.1 and a molecular weight of 2830.

A second batch of polyester glycol is made by the following procedure. Into a vessel equipped with a take-off condenser are placed 4375 parts adipic acid, 1913 parts of ethylene glycol, 745 parts propylene glycol and 0.5 part of p-toluene sulfonic acid. The mass is heated gradually from 140° to 230° C. over a period of twelve hours while a stream of nitrogen is passed slowly over the liquid. The mass is placed under vacuum at a pressure of 1 mm. for nine hours at 215–220° C. The resulting polyester glycol has a hydroxyl number of 63.1, an acid number of 1.2 and a molecular weight of 1740.

A mixture of 3620 parts of the first polyester and 1360 parts of the second, the mixture having an average molecular weight of 2410, is placed in a Werner-Pfleiderer mixer with 810 parts of 4,4'-diphenyl diisocyanate. The diisocyanate is added at 80° C. The mass is mixed for 35 minutes while the temperature is gradually increased from 80 to 112° C. and then for an additional 35 minutes while the temperature is increased to 122° C. It is held at approximately 122° C. for 50 minutes while mixing. The mixture is now in the form of a thick pasty mass. It is cooled to 98° C. and 9 parts of water are added. The mass is mixed at 98–105° C. for 30 minutes. The top is kept on the mixer during this time. Then 1 part of water is added and after 30 more minutes of mixing at about 105° C. another part of water is added. Mixing is continued for 25 more minutes and the mass is discharged. It is milled on a rubber mill and gives a soft polymer.

B. PREPARATION OF POLYALKYLENE ETHER GLYCOL-DIISOCYANATE ELASTOMER 225 parts of polytetramethylene ether glycol (mol. wt. 2970, acid No. 0.53, H2O 0.21%) are put in a Werner-Pfleiderer mixer at 40° C. There are added 27.7 parts of 2,4-tolylene diisocyanate while mixing. The temperature is raised from 40 to 70° C. over a 30 minute period and held at 70–80° C. for 2.5 hours. 1.53 parts of water are added and mixing is continued for 90 minutes, the jacket temperature of the mixer being held at 105° C. The product is then a rubbery dough which will not stay on the blades of the mixer. It is removed from the mixer and sheeted out on a rubber mill where 0.50 part of piperidine per 100 parts of polymer is added as a stabilizer.

The elastomeric product so obtained is milled on a rubber mill with 4 parts of di(3-isocyanato-4-methylphenyl)-urea per 100 parts of elastomer and sheeted off the mill.

C. COMPOUNDING OF OTHER ELASTOMERS

Stocks of various elastomers are compounded on a rubber mill and sheeted off. The compositions are as follows, parts being by weight:

|  | I | II | III | IV |
|---|---|---|---|---|
| Natural rubber | 100 | 100 |  |  |
| GR-S 1500 [a] |  |  | 100 |  |
| X-638 GR-S [b] |  |  |  | 100 |
| Peptizer—36% xylyl mercaptan in 64% inert hydrocarbon | 0.5 |  |  |  |
| Zinc oxide | 4.0 | 5.0 | 3.5 | 3.5 |
| Carbon black | 50.0 | 45.0 | 50.0 | 50.0 |
| Sulfur | 2.25 | 2.5 | 1.75 | 1.75 |
| 2-Mercaptothiazoline | 0.8 |  |  |  |
| Softener |  |  |  |  |
| Stearic acid | 3.0 | 5.0 | 10.0 | 10.0 |
| Phenyl-beta-naphthylamine | 1.0 | 2.0 | 2.0 | 2.0 |
| Antioxidant [c] |  | 1.0 | 1.0 | 1.0 |
| Tetramethyl thiuram monosulfide | 1.3 |  |  |  |
| Benzothiazole disulfide |  |  | 0.3 | 0.3 |
| Zinc salt of mercaptobenzothiazole (90%) |  |  | 0.3 | 0.3 |
| Salicylic acid |  | 1.5 |  |  |
|  |  | 0.5 |  |  |

[a] A butadiene-styrene copolymer.
[b] A butadiene polymer, as defined in "GR-S and GR-I Synthetic Rubbers" published by the Office of Synthetic Rubber, Reconstruction Finance Corp., Washington, D. C. X-638 GR-S is further characterized in Rubber Age 69, 215 (May, 1951).
[c] 25% di-p-methoxydiphenylamine, 25% diphenyl-p-phenylene-diamine, 50% phenyl-beta-naphthylamine.

|  | V | VI | VII |
|---|---|---|---|
| "Hycar" OR-25 [d] | 100 |  |  |
| "Hycar" PA-21 [e] |  | 100 |  |
| Neoprene GR-T [f] |  |  | 100 |
| Carbon black | 50.0 | 50.0 | 33.0 |
| Softener | 25.0 | 25.0 | 5.0 |
| Zinc oxide | 5.0 | 5.0 | 5.0 |
| Stearic acid | 1.0 | 1.0 |  |
| Magnesium oxide |  |  | 4.0 |
| Petrolatum |  |  | 1.0 |
| Tackifier |  |  | 5.0 |
| Tetramethyl thiuram disulfide | 3.0 | 3.0 |  |
| Di-o-tolylguanidine salt of dicatechol borate |  |  | 0.5 |

[d] Butadiene-acrylonitrile copolymer.
[e] Polyacrylic acid ester polymer.
[f] Polymer of 2-chlorobutadiene-1,3 stabilized with a thiuram disulfide and containing a non-discoloring antioxidant.

D. PREPARATION OF CEMENTS

Cements are prepared from certain of the stocks described above by stirring them in solvents in the following proportions until complete solution is obtained.

| Cement | II | V | VII |
|---|---|---|---|
| Natural rubber stock II | 100 |  |  |
| "Hycar" OR-25 stock V |  | 100 |  |
| Neoprene stock VII |  |  | 100 |
| Gasoline | 400 |  |  |
| Methylethylketone |  | 400 | 200 |
| Hexane |  |  | 200 |

E. ADHESION TESTS

Tests are made using squares 6 x 6 inches, cut from sheets of the elastomers described in A, B and C above, or prepared by coating squares of woven cotton duck fabric with three separately applied layers of each of the cements described in D above. Assemblies are prepared as follows:

(1) Squares of the polyester-diisocyanate elastomer and the polyalkylene ether glycol-diisocyanate elastomer each 50 mils thick are washed with carbon tetrachloride, dried and pressed together. The opposite sides are backed with cotton duck and the assembly is cured in a plunger mold at 280° F. for one hour.

(2) A square of the polyester-diisocyanate elastomer is placed between two squares of fabric coated with three layers of natural rubber cement II described above. The assembly is cured in a plunger mold at 280° F. for one hour. In the same way, assemblies are prepared using fabric coated with each of the other cements, V and VII, described above.

(3) A series of samples is prepared, in each of which a square of the polyalkylene ether glycol-diisocyanate elastomer is attached to a square of one of the other elastomers. Two such structures are prepared for each of the elastomer stocks I, III, IV, V and VI described in C above, in one of which no cement is used and in the other of which the polychloroprene cement VII described in D above is employed. In the preparation of the former, a side of each component is swabbed with a 50/50 mixture of methylethylketone and hexane, air dried, the two sides placed together and fabric-backed with square woven cotton fabric and cured in a press at 280° F. for one hour. In the preparation of the polychloroprene cemented structures, a side of each component is brushed with the polychloroprene cement described above, air dried, and joined together and finished off exactly as in the case of the structures made without cement.

On inch strips are cut from the various assemblies and tested on a Scott tester with the results shown below:

| Assembly | Bond | Adhesion, lbs./in. |
|---|---|---|
| (1) | Polyester-diisocyanate elastomer to polyalkylene ether glycoldiisocyanate elastomer | 60+ |
| (2) | Polyester-diisocyanate elastomer to: |  |
|  | Natural rubber | 11 |
|  | "Hycar" OR-25 | 14 |
|  | Neoprene GR-T | 27 |

|  |  | No cement | Polychloroprene cement |
|---|---|---|---|
| (3) | Polyalkylene ether glycol-diisocyanate elastomer to: |  |  |
|  | Natural rubber | 4 | 78+ |
|  | GR-S 1500 | 6 | 60 |
|  | X-638 GR-S | 6 | 22 |
|  | "Hycar" OR-25 | 5 | 57 |
|  | "Hycar" PA-21 | 3 | 13 |

EXAMPLE 2

A four-ply laminate is prepared from sheets of polyester-diisocyanate elastomer, polyalkylene ether glycol-diisocyanate elastomer, polychloroprene and natural rubber, in that order. The surfaces of each sheet are washed with carbon tetrachloride and dried before the sheets are stacked together. The assembly is cured in a mold at 280° F. The four plies are strongly bonded together, as tested by hand tear.

Similar laminates are prepared using, in place of the natural rubber, GR-S 1500, X-638 GR-S, "Hycar" OR-25 and "Hycar" PA-21, respectively. In each case a strong bonded structure is obtained.

EXAMPLE 3

*Fabrication of a retread tire*

A commercial 8.00 x 15 passenger car tire with a GR-S tread is buffed until the original tread design is removed. The buffed area is then coated with cement VII of Example 1.

A polychloroprene stock identical with stock VII of Example 1 except for containing 2 parts of petrolatum and no tackifier is compounded on a rubber mill. This polychloroprene stock is calendered to 50 mils thickness. A 6-inch wide strip is wound around the calender take-off wheel, which is 94 inches in circumference.

A portion of the polyalkylene ether glycol-diisocyanate elastomer stock described in Example 1 is calendered to 50 mils thickness and a 5-inch strip is taken off onto the polychloroprene strip on the take-off wheel.

The polyester rubber described in Example 1 is milled and then calendered to 50 mils thickness. A 5-inch strip is wound on top of the layer of polyalkylene ether glycol diisocyanate elastomer, the addition of the polyester rubber being continued until 5 plies are put on. The total tread slab thickness is 350 mils.

The slab is removed from the take-off wheel and the bottom or polychloroprene side is coated with polychloroprene cement VII of Example 1 and dried. The tread is rolled and stitched onto the previously prepared tire carcass.

The assembly is placed in a tire mold and cured at 280° F. for 1 hour at an internal pressure of 140–160 lbs. per square inch. The mold is spray cooled and the tire allowed to cool 15 hours before removal from the mold.

The tire shows good structure. It is placed on an automobile and road-tested. At the end of 5000 miles, no tread separation is apparent.

The composite structures of this invention are useful in any application where it is desired to take advantage of the different properties of the polyester-diisocyanate elastomers and the other conventional types of elastomer. Such structures are particularly useful in pneumatic or solid tires, in which natural rubber or GR–S may be used to form the carcass of the tire in which the cords are embedded and the polyester-diisocyanate elastomer may be used to form the tread or wearing surface. Such tires may be of either new or retreaded construction, and display superior tread wear resistance without the tendency for tread separation which is encountered when it is attempted to bond the polyester-diisocyanate elastomers to the tire carcass directly or with adhesives other than here described. Other applications of the composite structures of this invention include wire or cable jackets, waterproof wrappings, hose structures and the like.

What is claimed is:

1. A composite elastic structure comprising, in intimate adherent relationship with one another, consecutive layers of (1) a polyester-diisocyanate elastomer, (2) a polyalkylene ether glycol-diisocyanate elastomer, (3) polychloroprene and (4) an elastomer selected from the group consisting of natural rubber, butadiene-styrene copolymers, butadiene polymers, butadiene-acrylonitrile copolymers, and polyacrylic acid ester polymers.

2. A composite elastic structure according to claim 1 in which the polyester-diisocyanate elastomer is the reaction product of a diisocyanate, water and a high molecular weight polyester formed from adipic acid, ethylene glycol and propylene glycol.

3. A composite elastic structure according to claim 1 in which the polyalkylene ether glycol-diisocyanate elastomer is the reaction product of a high molecular weight polytetramethylene ether glycol, 2,4-tolylene diisocyanate and water.

4. A composite elastic structure comprising, in intimate adherent relationship with one another, consecutive layers of (1) a polyester-diisocyanate elastomer, (2) a polyalkylene ether glycol-diisocyanate elastomer, (3) polychloroprene and (4) a butadiene-styrene copolymer.

5. A composite elastic structure comprising, in intimate adherent relationship with one another, consecutive layers of (1) a polyester-diisocyanate elastomer, (2) a polyalkylene ether glycol-diisocyanate elastomer, (3) polychloroprene and (4) natural rubber.

6. A composite elastic structure comprising a layer of a polyester-diisocyanate elastomer, a layer of a polyalkylene ether glycol-diisocyanate elastomer, and a polychloroprene layer, the polyalkylene ether glycol-diisocyanate elastomer layer being in intimate adherent relationship with and interposed between the other two layers.

7. A vehicle tire having an outer wearing surface comprising a polyester-diisocyanate elastomer, said elastomer being attached by intervening adherent layers of a polyalkylene ether glycol-diisocyanate elastomer and of polychloroprene to an inner portion of the tire casing comprising a butadiene-styrene copolymer, the layer of polyalkylene ether glycol-diisocyanate elastomer being interposed between the outer layer and the polychloroprene layer.

References Cited in the file of this patent

UNITED STATES PATENTS

| | | |
|---|---|---|
| 2,284,637 | Catlin | June 2, 1942 |
| 2,284,896 | Hanford et al. | June 2, 1942 |
| 2,597,025 | Orth | May 20, 1952 |
| 2,650,212 | Windemuth | Aug. 25, 1953 |